(12) United States Patent
Jackson et al.

(10) Patent No.: US 12,104,503 B2
(45) Date of Patent: Oct. 1, 2024

(54) ENVIRONMENTAL BARRIER COATING

(71) Applicant: Raytheon Technologies Corporation, Farmington, CT (US)

(72) Inventors: Richard Wesley Jackson, Mystic, CT (US); Xia Tang, West Hartford, CT (US); James T. Beals, West Hartford, CT (US); Gajawalli V. Srinivasan, South Windsor, CT (US); William K. Tredway, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 785 days.

(21) Appl. No.: 17/006,151

(22) Filed: Aug. 28, 2020

(65) Prior Publication Data
US 2022/0065113 A1 Mar. 3, 2022

(51) Int. Cl.
*F01D 5/28* (2006.01)
*B32B 15/04* (2006.01)
(Continued)

(52) U.S. Cl.
CPC .............. *F01D 5/288* (2013.01); *B32B 15/04* (2013.01); *B32B 15/043* (2013.01); *B32B 15/16* (2013.01);
(Continued)

(58) Field of Classification Search
CPC . F01D 5/288; F01D 5/284; F01D 5/28; F01D 25/007; F01D 25/005; C04B 35/01; C04B 35/14; C04B 35/80; C04B 35/565; C04B 41/009; C04B 41/5035; C04B 41/5071; C04B 41/5089; C04B 41/52; C04B 41/87; C04B 41/89; C04B 41/5024; C04B 41/522; C04B 41/5042; C04B 41/4539; C04B 41/507; C04B 41/5022; C04B 41/5059; C04B 2103/0021; C04B 2103/001; C04B 2235/3481; C04B 2235/365; C04B 2235/3813; C23C 24/08; C23C 24/085; C23C 26/00; C23C 28/04;
(Continued)

(56) References Cited

U.S. PATENT DOCUMENTS 7,005,191 B2 2/2006 Perepezko et al.
7,951,459 B2 5/2011 Tang et al.
(Continued)

FOREIGN PATENT DOCUMENTS

EP 104630699 5/2015
EP 3473608 4/2019

OTHER PUBLICATIONS

Neshpor, "The thermal conductivity of the silicides of transition metals," Inzhernerno-Fizicheskii Zhurnal, vol. 15, No. 2, pp. 750-752 (p. 751; Table 1). (Year: 1968).*
(Continued)

*Primary Examiner* — Michael E. La Villa
(74) *Attorney, Agent, or Firm* — Carlson, Gaskey & Olds, P.C.

(57) ABSTRACT

An article includes a substrate and a barrier layer on the substrate. The barrier layer includes a matrix, diffusive particles dispersed in the matrix, and gettering particles dispersed in the matrix. The gettering particles include at least one alloyed metal silicide. A composite material and a method of fabricating an article are also disclosed.

18 Claims, 2 Drawing Sheets

(51) Int. Cl.
- B32B 15/16 (2006.01)
- B32B 18/00 (2006.01)
- C04B 35/01 (2006.01)
- C04B 35/14 (2006.01)
- C04B 35/80 (2006.01)
- C04B 41/00 (2006.01)
- C04B 41/50 (2006.01)
- C04B 41/52 (2006.01)
- C04B 41/87 (2006.01)
- C04B 41/89 (2006.01)
- C23C 24/08 (2006.01)
- C23C 26/00 (2006.01)
- C23C 28/04 (2006.01)
- F01D 25/00 (2006.01)
- F23R 3/00 (2006.01)

(52) U.S. Cl.
CPC ............... *B32B 18/00* (2013.01); *C04B 35/01* (2013.01); *C04B 35/14* (2013.01); *C04B 35/80* (2013.01); *C04B 41/009* (2013.01); *C04B 41/5035* (2013.01); *C04B 41/5071* (2013.01); *C04B 41/5089* (2013.01); *C04B 41/52* (2013.01); *C04B 41/87* (2013.01); *C04B 41/89* (2013.01); *C23C 24/08* (2013.01); *C23C 24/085* (2013.01); *C23C 26/00* (2013.01); *C23C 28/04* (2013.01); *C23C 28/042* (2013.01); *C23C 28/044* (2013.01); *C23C 28/048* (2013.01); *F01D 5/28* (2013.01); *F01D 5/284* (2013.01); *F01D 25/005* (2013.01); *F01D 25/007* (2013.01); *F23R 3/007* (2013.01); *C04B 2235/3481* (2013.01); *C04B 2235/365* (2013.01); *C04B 2235/3813* (2013.01); *F05D 2240/11* (2013.01); *F05D 2240/35* (2013.01); *F05D 2300/21* (2013.01); *F05D 2300/211* (2013.01); *F05D 2300/222* (2013.01); *F05D 2300/502* (2013.01); *F05D 2300/6033* (2013.01); *F23R 2900/00018* (2013.01); *Y02T 50/60* (2013.01); *Y10T 428/12486* (2015.01); *Y10T 428/12493* (2015.01); *Y10T 428/12535* (2015.01); *Y10T 428/12597* (2015.01); *Y10T 428/12604* (2015.01); *Y10T 428/12611* (2015.01); *Y10T 428/12618* (2015.01); *Y10T 428/12625* (2015.01); *Y10T 428/12667* (2015.01); *Y10T 428/12674* (2015.01); *Y10T 428/12931* (2015.01); *Y10T 428/12944* (2015.01); *Y10T 428/12979* (2015.01); *Y10T 428/12986* (2015.01); *Y10T 428/26* (2015.01)

(58) Field of Classification Search
CPC ... C23C 28/042; C23C 28/048; C23C 28/044; F23R 3/067; F23R 2900/00018; F05D 2240/11; F05D 2240/35; F05D 2300/21; F05D 2300/211; F05D 2300/222; F05D 2300/502; F05D 2300/6033; Y02T 50/60; B32B 15/04; B32B 15/043; B32B 15/16; B32B 18/00; Y10T 428/12486; Y10T 428/12493; Y10T 428/12535; Y10T 428/12674; Y10T 428/12667; Y10T 428/12625; Y10T 428/12597

See application file for complete search history.

(56) References Cited

U.S. PATENT DOCUMENTS

| | | | |
|---|---|---|---|
| 8,247,085 | B2 | 8/2012 | Bewlay et al. |
| 2014/0272344 | A1 | 9/2014 | Wan et al. |
| 2017/0327937 | A1 | 11/2017 | Smyth et al. |
| 2017/0335118 | A1* | 11/2017 | Tang ............... F01D 5/288 |
| 2019/0119803 | A1 | 4/2019 | Tang et al. |
| 2021/0331984 | A1* | 10/2021 | Sudre ............... C04B 41/89 |

OTHER PUBLICATIONS

Ingemarsson et al. "Oxidation behavior at 300-1000oC of a (Mo, W)Si" 2-based composite containing boride", Intermetallics, Elsevier Science Publishers B.V, GB, vol. 18, No. 1, pp. 77-86. Jan. 1, 2021.
International Report on Patentability for International Patent Application No. 21183172.2 dated Nov. 22, 2021.

* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a substrate and a barrier layer on the substrate. The barrier layer includes a matrix, diffusive particles dispersed in the matrix, and gettering particles dispersed in the matrix. The gettering particles include at least one alloyed metal silicide.

In a further example of the foregoing, the alloyed metal silicide includes three or more metals.

In a further example of any of the foregoing, the alloyed metal silicide includes first and second metal components. The first and second metal components are refractory metals.

In a further example of any of the foregoing, the first metal component is one of Mo, Nb, Zr, Cr, V, Ti, W, Ta, Hf. The second metal component is one of Mo, Nb, Zr, Cr, V, Ti, W, Ta, Hf.

In a further example of any of the foregoing, a metal component of the alloyed metal silicide includes one or more of Ti, Zr, and Hf. The combined concentration of Ti, Zr, and Hf is less than 10%.

In a further example of any of the foregoing, the metal silicide has a lattice in the form M-$Si_2$, where M is a metal site.

In a further example of any of the foregoing, wherein the metal silicide is in the form $\alpha_{1-w}\beta_w Si_2$, $\alpha_{1-w-x}\beta_w\gamma_x Si_2$, $\alpha_{1-w-x-y}\beta_w\gamma_x\delta_y Si_2$, or $\alpha_{1-w-x-y-z}\beta_w\gamma_x\delta_y\varepsilon_z Si_2$, where $\alpha$, $\beta$, $\gamma$, $\delta$, $\varepsilon$ are metals and $w \geq 0.2$, $x \geq 0.15$, $y \geq 0.1$.

In a further example of any of the foregoing, the metal silicide has a lattice in the form $M_5$-$Si_3$, where M is a metal site.

In a further example of any of the foregoing, the metal silicide is in the form $(\alpha_{1-w}\beta_w)_5 Si_3$, $(\alpha_{1-w-x}\beta_w\gamma_x)_5 Si_3$, $(\alpha_{1-w-x-y}\beta_w\gamma_x\delta_y)_5 Si_3$, or $(\alpha_{1-w-x-y-z}\beta_w\gamma_x\delta_y\varepsilon_z)_5 Si_3$, where $\alpha$, $\beta$, $\gamma$, $\delta$, $\varepsilon$ are metals and $w \geq 0.2$, $x \geq 0.15$, $y \geq 0.1$.

In a further example of any of the foregoing, the diffusive particles are barium-magnesium alumino-silicate particles.

In a further example of any of the foregoing, the diffusive particles are borosilicate glass particles or refractory metal boride particles.

In a further example of any of the foregoing, the matrix is $SiO_2$, and wherein the metal silicide has first and second metal components, and the first and second metal components have a lower oxygen affinity than silicon affinity.

In a further example of any of the foregoing, the gettering particles have a thermal conductivity that is less than about 30 W/mK.

In a further example of any of the foregoing, the article is an airfoil, combustor wall or blade outer seal for a gas turbine engine.

A composite material according to an exemplary embodiment of this disclosure, among other possible things includes a matrix and diffusive particles dispersed in the matrix. The diffusive particles provide self-healing to the composite material. The composite material also includes gettering particles dispersed in the matrix. The gettering particles include at least one alloyed metal silicide. The gettering particles inhibit the infiltration of oxidants through the composite material.

In a further example of the foregoing, the alloyed metal silicide includes three or more metals.

In a further example of any of the foregoing, the alloyed metal silicide includes first and second metal components. The first and second metal components are refractory metals.

In a further example of any of the foregoing, the first metal component is one of Mo, Nb, Zr, Cr, V, Ti, W, Ta, Hf. The second metal component is one of Mo, Nb, Zr, Cr, V, Ti, W, Ta, Hf.

A method of fabricating an article according to an exemplary embodiment of this disclosure, among other possible things includes applying a slurry containing diffusive particles, gettering particles, and matrix material in a carrier fluid to a substrate. The gettering particles include at least one alloyed metal silicide. The method also includes sintering the slurry to form a barrier layer.

In a further example of the foregoing, the alloyed metal silicide incudes a first metal component and a second metal component. The first metal component is one of Mo, Nb, Zr, Cr, V, Ti, W, Ta, Hf. The second metal component is one of Mo, Nb, Zr, Cr, V, Ti, W, Ta, Hf.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
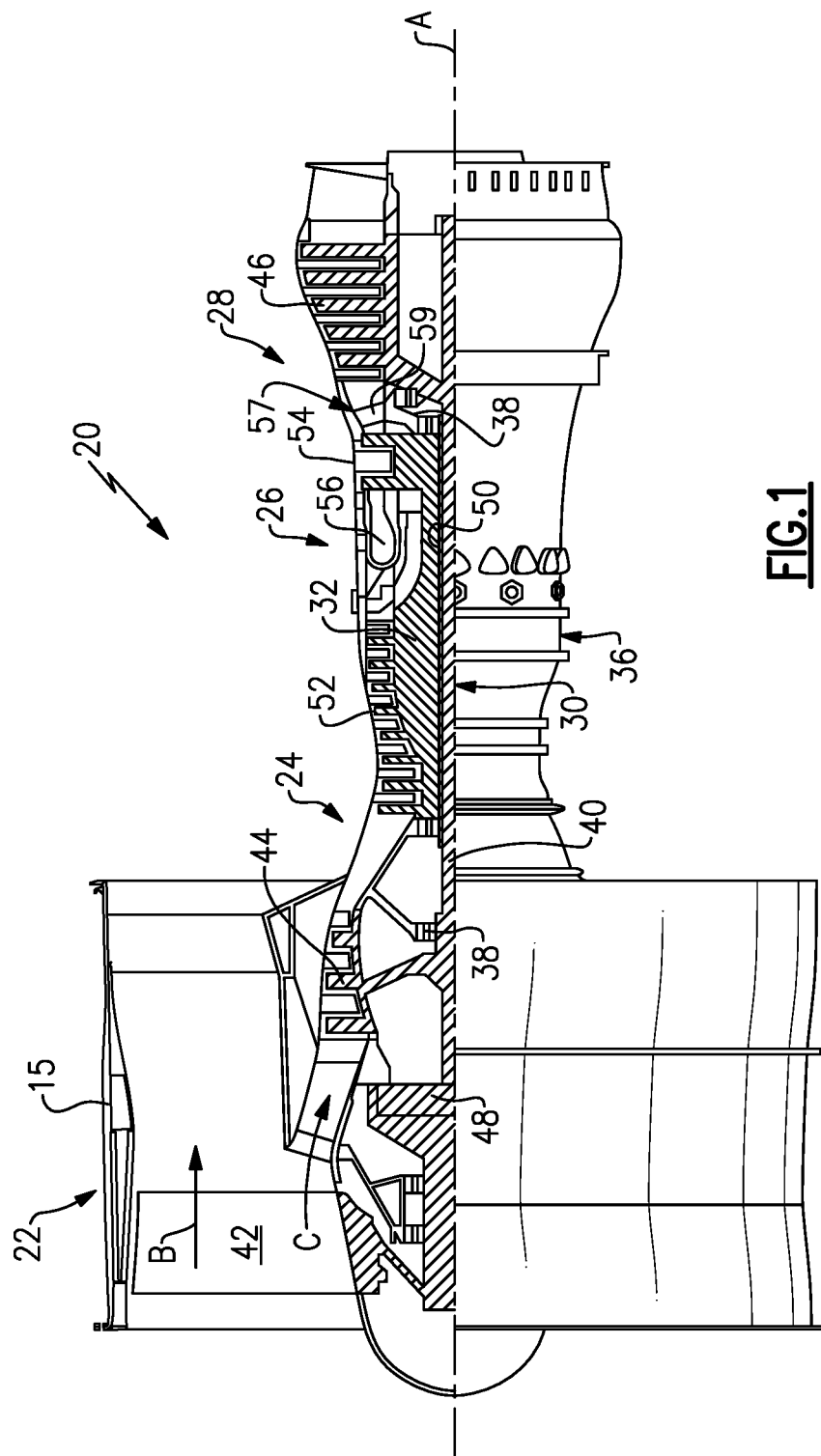
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

Figure 2:
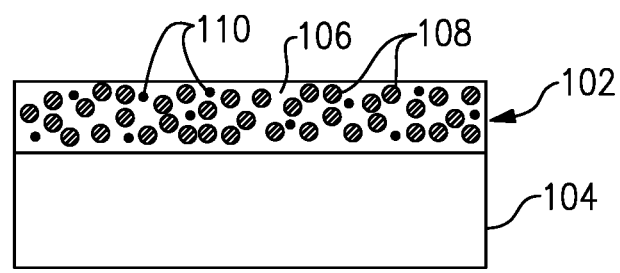
FIG. 2 illustrates an example article having a barrier layer of a composite material.

FIG. 2 schematically illustrates a representative portion of an example article 100 for the gas turbine engine 20 that includes a barrier 102 formed of a composite material disposed on a substrate 104. The article 100 can be, for example, an airfoil in the compressor section 24 or turbine section 28, a combustor liner panel in the combustor section 26, a blade outer air seal, or other component that would benefit from the examples herein. In this example, the barrier 102 is used as an environmental barrier layer to protect the underlying substrate 104 from environmental conditions, as well as thermal conditions. As will be appreciated, the barrier 102 can be used as a stand-alone barrier layer, as an outermost/top coat with additional underlying layers, or in combination with other coating under- or over-layers, such as, but not limited to, ceramic-based topcoats.

The composite material 102 includes a matrix 106, a dispersion of "gettering" particles 108, and a dispersion of "diffusive" particles 110. The matrix 106 is generally an oxide-based material. One example is can be a silicon oxide such as silicon dioxide ($SiO_2$). Other example oxides are hafnium silicate ($HfSiO_4$), zirconium silicate ($ZrSiO_4$), mullite ($Al_6Si_2O_{13}$), and ytterbium disilicates ($Yb_2Si_2O_7$).

The barrier 102 protects the underlying substrate 104 from oxygen and moisture. For example, the substrate 104 can be a ceramic-based substrate, such as a silicon-containing ceramic material. One example is silicon carbide. The substrate 104 can also be a metallic substrate such as a high temperature alloy. Example high temperature alloys are refractory metal alloys and nickel-based superalloys.

The gettering particles 108 and the diffusive particles 110 of the barrier layer function as an oxygen and moisture diffusion barrier to limit the exposure of the underlying substrate 104 to oxygen and/or moisture from the surrounding environment. The gettering particles 108 are reactive with respect to oxidants such as oxygen and water and mitigate oxidants from diffusing through the barrier 102 and reaching the substrate 104.

The gettering particles 108 are alloyed silicide particles, meaning the gettering particle 108 include at least two metals and silicon. In further examples, the alloyed silicide particles could include three, four, or five metals. Metal silicides provide make good gettering particles 108 because of their high reactivity with respect to oxidants.

In some examples, the metal constituents can be selected to minimize reactivity of the gettering particles 108 with respect to the matrix 106 material. For instance, where the matrix 106 is $SiO_2$, metals with a lower oxygen affinity than silicon affinity can be selected. Still, the resulting alloyed silicides can act as gettering particles 108 as the silicon present in the silicide retains sufficient reactivity with oxidants. In a particular example, the metals are selected so that they do not react with $SiO_2$ in the displacement reaction $SiO_2+xyM=yMxO_2+Si$ (e.g., the standard free energy of the reaction is such that the reaction would not spontaneously occur).

In general, dense metals (e.g., those with higher atomic mass per atomic volume) have lower thermal conductivity. In one example, the metals are refractory metals, which are relatively dense. In a further example, the metals are selected from the following: Mo, Nb, Zr, Cr, V, Ti, W, Ta, Hf. In general, alloyed silicides have lower thermal conductivity than metal silicides with only a single metal. Without being bound by any particular theory, alloyed silicides have comparatively high phonon scattering resulting from the different masses of the atomic elements and a highly distorted lattice. In general, the higher the difference in atomic mass of the metallic elements, the lower the thermal conductivity of the silicide. For these reasons, the alloyed metal silicide gettering particles 108 can contribute to the thermal protection of the substrate 104, which in turn can improve the durability, mechanical capability, and/or longevity of the article 100. Though the diffusive particles 110 provide thermal protection to the substrate 104, the alloyed metal silicide gettering particles 108 allow for improved thermal protection for the substrate 104. In one example, the gettering particles 108 have a thermal conductivity is less than about 30 W/mK. In a further example, the gettering articles 108 have a thermal conductivity that is less than about 15 W/mK.

The gettering particles 108 form a lattice in the barrier 102. On example lattice is in the form $M-Si_2$ where M is a metal site. For this example, the metal silicide can be in the form of $\alpha_{1-w}\beta_w Si_2$, $\alpha_{1-w-x}\beta_w\gamma_x Si_2$, $\alpha_{1-w-x-y}\beta_w\gamma_x\delta_y Si_2$, or $\alpha_{1-w-x-y-z}\beta_w\gamma_x\delta_y\varepsilon_z Si_2$, where $\alpha$, $\beta$, $\gamma$, $\delta$, $\varepsilon$ are metals and $w\geq 0.2$, $x\geq 0.15$, $y\geq 0.1$. One example gettering particle 108 is $W_{0.4}Mo_{0.4}Cr_{0.2}Si_2$, which has a tetragonal lattice structure known as a $C11_b$ structure. Another example gettering particle 108 is $W_{0.2}Ta_{0.2}Mo_{0.2}Nb_{0.2}Cr_{0.2}Si_2$, which has a hexagonal lattice structure known as a C40 structure. Other lattice structures can be orthorhombic (known as C54), for instance.

Another example lattice is in the form $M_5-Si_3$. For this example, the metal silicide can be in the form $(\alpha_{1-w}\beta_w)_5 Si_3$, $(\alpha_{1-w-x}\beta_w\gamma_x)_5 Si_3$, $(\alpha_{1-w-x-y}\beta_w\gamma_x\delta_y)_5 Si_3$, or $(\alpha_{1-w-x-y-z}\beta_w\gamma_x\delta_y\varepsilon_z)_5 Si_3$, where $\alpha$, $\beta$, $\gamma$, $\delta$, $\varepsilon$ are metals and $w\geq 0.2$, $x\geq 0.15$, $y\geq 0.1$.

In a further example, the metal silicides include one or more of Ti, Zr, and Hf, where the combined concentration of Ti, Zr, and Hf is less than 10%. One particular example is $W_{0.3}Nb_{0.1}Mo_{0.6-x}\delta_x Si_2$, where $\delta$ is Ti, Hf, or Zr, and x is less than 0.1. This example has a C11 structure. Another example is $W_{0.2}Ta_{0.2}Mo_{0.2}Nb_{0.4-x}\delta_x Si_2$; where $\delta$ is Ti, Hf, or Zr, and x is less than 0.1. This example has a C40 structure.

The gettering particles 108 can include more than one type of gettering particles 108. For instance, the gettering particles 108 can include a mixture of alloyed metal silicides, as discussed above, and other particles, which could be other silicides such as non-alloyed metal silicides. In general enough alloyed metal silicide particles are included in the gettering particles 108 to provide the benefits described above, but the remainder of the gettering particles 108 can comprise more cost-effective options. In one example, the gettering particles 108 include at least 50% alloyed metal silicide particles. In a further example, the gettering particles 108 include at least 75% alloyed metal silicide particles. In a more particular example, the gettering particles 108 include 25% of the gettering particles are $MoSi_2$ and 75% of the gettering particles are $W_{0.4}Mo_{0.4}Cr_{0.2}Si_2$. The gettering particles 108 have a melting point that his higher than the operational temperature of the barrier 102, which in some examples is about 2700 degrees F. In the example where the gettering particles 108 have more than one type of alloyed metal silicide, the average melting point of the gettering particles 108 is above the operational temperature of the barrier 102.

In the example where the gettering particles 108 include more than one type of gettering particles 108 of the example alloyed metal silicides discussed above, the alloyed metal silicides are selected to generally maintain phase stability within the barrier 102. That is, metal silicides are selected to discourage phase separation of the metal silicides phases within the barrier 102. In general, the more homogenous the distribution of the gettering particles 108 within the barrier 102, the better the thermal protection provided by the barrier layer 102 to the substrate 104.

In some examples, the gettering particles 108 have an average diameter between about 1 and 20 microns.

Without being bound by any particular theory, the diffusive particles 110 enhance oxidation and moisture protection by diffusing to the outer surface of the barrier layer opposite of the substrate 104 and forming a sealing layer that seals the underlying substrate 104 from oxygen/moisture exposure. Further, the diffusion behavior of the diffusive particles 110 may operate in a "self-healing" manner to seal any microcracks that could form in the barrier layer. Sealing the micro-cracks could prevent oxygen from infiltrating the barrier layer, which further enhances the oxidation resistance of the barrier layer. One example diffusive particle 110 is barium-magnesium alumino-silicate particles ("BMAS particles 110"), though other examples are contemplated such as calcium alumino-silicate (CAS), yttrium aluminosilicate and ytterbium alumino-silicate, borosilicate glasses (such as Pyrex), refractory metal borides, such as hafnium diboride ($HfB_2$) or zirconium diboride ($ZrB_2$) or titanium boride ($TiB_2$). The diffusive particles 110 can also include reaction products of diffusive products 110 after oxidation or upon reaction of the diffusive particles 110 with the matrix 106 material. In some examples, the reaction products can also become matrix 106 materials. For instance, hafnium diboride produces hafnium dioxide ($HfO_2$) and boron oxide ($B_2O_3$). Hafnium dioxide tends to react with silicon dioxide, which could be a component of matrix 106, to form $HfSiO_4$, which becomes part of the matrix 106. Boron oxide dissolves into silicon dioxide to form a boro-silica glass mixture, which can act as diffusive particles 110.

Figure 3:
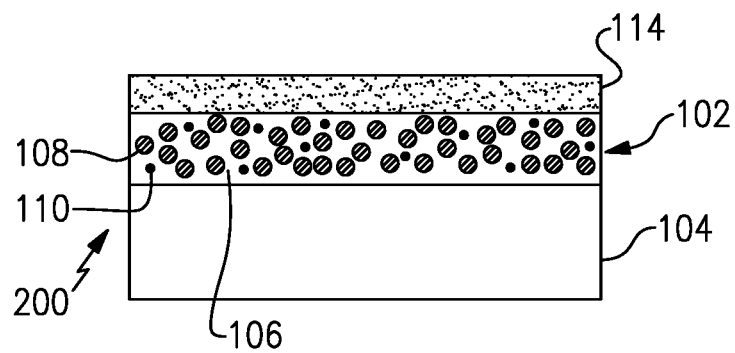
FIG. 3 illustrates another example article having a barrier layer of a composite material that includes barium-magnesium alumino-silicate particles.

FIG. 3 shows another example article 200 that includes the barrier 102 arranged on the substrate 104. In this example, the article 200 additionally includes a ceramic-based top coat 114 interfaced with the barrier 102. As an example, the ceramic-based top coat 114 can include one or more layers of an oxide-based material. The oxide-based material can be, for instance, hafnium-based oxides, zirconium-based oxides, ytterbium-based oxides (such as hafnia, hafnium silicate, ytterbium disilicates silicate, ytterbium monosilicates, yttria stabilized zirconia or gadolinia stabilized zirconia), or combinations thereof, but is not limited to such oxides. The top coat 114 contributes to improved thermal and environmental protection to the substrate 104, for example, by resisting the infiltration of steam into the barrier 102, and protects the barrier 102 from material recession that can be caused by steam at high temperatures.

The gettering particles 108 are reactive with respect to oxidant particles, which could diffuse into the barrier 102. In this way, the gettering particles 108 could reduce the likelihood of those oxidant particles from reaching and oxidizing the substrate 104. The gettering particles 108 have a diameter between about 1 and 75 microns.

The gettering particles 108 can include a mixture of one or more types of particles. One example particle is silicon oxycarbide particles. Another type of gettering particle 108 is SiC and a third type is unalloyed $MoSi_2$.

In one example, the barrier 102 includes, by volume, 1-30% of the diffusive particles 110. In a more particular example, the barrier 102 includes, by volume, 1-10% of diffusive particles 110. In a further example, the barrier 102 includes, by volume, 30-94% of the gettering particles 108. In a particular example, the barrier includes, by volume, 60-90% of the gettering particles 108. In one further example, the barrier 102 includes, by volume, 5-40% of the matrix 106. In a further example, the barrier 102 includes, by volume, 1-30% of the diffusive/BMAS particles 110, 5-40% of the matrix 106, and a balance of the gettering particles 108.

The barrier 102 can be fabricated using a slurry coating method. The appropriate slurries can be prepared by mixing components gettering particles 108, diffusive particles 110, and matrix 106 material such as a powder of silicon dioxide or colloidal silica (Ludox) in a carrier fluid, such as water. The slurries can be mixed by agitation or ball milling and the resulting slurry can be painted, dipped, sprayed or otherwise deposited onto the underlying substrate 104. The slurry can then be dried at room temperature or at an elevated temperature to remove the carrier fluid. In one example, the slurry is dried and cured at about 200° C. for at least 15 minutes. The green coating can then be sintered at an elevated temperature in air for a selected amount of time to form the barrier 102. In one example, the sintering includes heating at 1500° C. or greater in an air environment for at least 1 hour. In another example, the green coating can be sintered in a two-step heat treatment. In the first step, the green coating is subjected to an intermediate temperature (e.g., less than 1500° C.) in an environment with a low oxygen partial pressure. In the second step, the green coating is heated at a high temperature (e.g., 1500° C. or greater) in an air environment for at least 1 hour).

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article comprising:
a substrate; and
a barrier layer on the substrate, the barrier layer including a matrix, diffusive particles dispersed in the matrix, and gettering particles dispersed in the matrix, wherein the diffusive particles comprise at least one of barium-magnesium alumino-silicate particles, calcium alumino-silicate particles, yttrium alumino-silicate particles, ytterbium alumino-silicate particles, borosilicate glass particles, refractory metal boride particles, hafnium diboride particles, zirconium diboride particles, or titanium diboride particles, the gettering particles include at least one alloyed metal silicide, wherein the matrix is $SiO_2$, and wherein the at least one alloyed metal silicide has first and second different metal components, and the first and second different metal components have a lower oxygen affinity than silicon affinity.

2. The article of claim 1, wherein the at least one alloyed metal silicide includes three or more different metals that each have a lower oxygen affinity than silicon affinity.

3. The article of claim 1, wherein the first and second different metal components are refractory metals.

4. The article of claim 3, wherein the first metal component is one of Mo, Nb, Zr, Cr, V, Ti, W, Ta, and Hf and wherein the second metal component is a different one of Mo, Nb, Zr, Cr, V, Ti, W, Ta, and Hf.

5. The article of claim 1, wherein a metal component of the at least one alloyed metal silicide includes one or more of Ti, Zr, and Hf, and wherein the combined atomoc concentration of Ti, Zr, and Hf is less than 10%.

6. The article of claim 1, wherein the at least one alloyed metal silicide has a lattice in the form M-$Si_2$, where M is a metal site.

7. The article of claim 6, wherein the at least one alloyed metal silicide is in the form $\alpha_{1-w}\beta_w Si_2$, $\alpha_{1-w-x}\beta_w\gamma_x Si_2$, $\alpha_{1-w-x-y}\beta_w\gamma_x\delta_y Si_2$, or $\alpha_{1-w-x-y-z}\beta_w\gamma_x\delta_y\varepsilon_z Si_2$, where $\alpha$, $\beta$, $\gamma$, $\delta$, and $\varepsilon$ are metals and $w \geq 0.2$, $x \geq 0.15$, and $y \geq 0.1$.

8. The article of claim 1, wherein the at least one alloyed metal silicide has a lattice in the form $M_5$-$Si_3$, where M is a metal site.

9. The article of claim 8, wherein the at least one alloyed metal silicide is in the form $(\alpha_{1-w}\beta_w)_5 Si_3$, $(\alpha_{1-w-x}\beta_w\gamma_x)_5 Si_3$, $(\alpha_{1-w-x-y}\beta_w\gamma_x\delta_y)_5 Si_3$, or $(\alpha_{1-w-x-y-z}\beta_w\gamma_x\delta_y\varepsilon_z)_5 Si_3$ where $\alpha$, $\beta$, $\gamma$, $\delta$, and $\varepsilon$ are metals and $w \geq 0.2$, $x \geq 0.15$, and $y \geq 0.1$.

10. The article of claim 1, wherein the diffusive particles are barium-magnesium alumino-silicate particles.

11. The article of claim 1, wherein the diffusive particles are borosilicate glass particles or refractory metal boride particles.

12. The article of claim 1, wherein the article is an airfoil, combustor wall or blade outer seal for a gas turbine engine.

13. An composite material, comprising:
a $SiO_2$ matrix,
diffusive particles dispersed in the matrix, wherein the diffusive particles provide self-healing to the composite material, wherein the diffusive particles comprise at least one of barium-magnesium alumino-silicate particles, calcium alumino-silicate particles, yttrium alumino-silicate particles, ytterbium alumino-silicate particles, borosilicate glass particles, refractory metal boride particles, hafnium diboride particles, zirconium diboride particles, or titanium diboride particles; and gettering particles dispersed in the matrix, wherein the gettering particles include at least one alloyed metal silicide, wherein the at least one alloyed metal silicide has first and second different metal components, the first and second different metal components have a lower oxygen affinity than silicon affinity, and wherein the gettering particles inhibit the infiltration of oxidants through the composite material.

14. The composite material of claim 13, wherein the alloyed metal silicide includes three or more different metals.

15. The composite material of claim 13, wherein the first and second different metal components are refractory metals.

16. The composite material of claim 15, wherein the first metal component is one of Mo, Nb, Zr, Cr, V, Ti, W, Ta, and Hf and wherein the second metal component is a different one of Mo, Nb, Zr, Cr, V, Ti, W, Ta, and Hf.

17. A method of fabricating an article, comprising:

applying a slurry containing diffusive particles, gettering particles, and a $SiO_2$ matrix material in a carrier fluid to a substrate, wherein the diffusive particles comprise at least one of barium-magnesium alumino-silicate particles, calcium alumino-silicate particles, yttrium alumino-silicate particles, ytterbium alumino-silicate particles, borosilicate glass particles, refractory metal boride particles, hafnium diboride particles, zirconium diboride particles, or titanium diboride particles, and wherein the gettering particles include at least one alloyed metal silicide, wherein the at least one alloyed metal silicide has first and second different metal components, and the first and second different metal components have a lower oxygen affinity than silicon affinity; and sintering the slurry to form a barrier layer.

18. The method of claim 17, wherein the first metal component is one of Mo, Nb, Zr, Cr, V, Ti, W, Ta, and Hf and wherein the second metal component is a different one of Mo, Nb, Zr, Cr, V, Ti, W, Ta, and Hf.

* * * * *